United States Patent [19]

Reilly et al.

[11] Patent Number: 4,960,818
[45] Date of Patent: Oct. 2, 1990

[54] POLYMER COMPOSITE PREFORM AND PROCESS FOR PRODUCING SAME

[75] Inventors: John J. Reilly, Elkins Park; Ihab L. Kamel, Drexel Hill, both of Pa.

[73] Assignee: The United States of America as represented by the Secretary of the Navy, Washington, D.C.

[21] Appl. No.: 343,106

[22] Filed: Apr. 25, 1989

[51] Int. Cl.$^5$ .................. C08K 3/08; C08L 71/00
[52] U.S. Cl. ...................... 524/440; 524/439; 524/441; 524/512; 524/599; 252/512; 252/513; 252/514
[58] Field of Search .......... 524/439, 440, 441; 252/512, 513, 514, 515

[56] References Cited

U.S. PATENT DOCUMENTS

| | | | |
|---|---|---|---|
| 2,761,854 | 9/1956 | Coler | 524/439 |
| 4,490,283 | 12/1984 | Kleiner | 524/441 |
| 4,592,782 | 6/1986 | Davies | 524/440 |

Primary Examiner—Lewis T. Jacobs
Assistant Examiner—E. J. Webman
Attorney, Agent, or Firm—James V. Tura; James B. Bechtel; Susan E. Verona

[57] ABSTRACT

A process is disclosed for producing a semicrystalline polymer composite preform which exhibits high strength and low electrical resistivity. Polyetheretherketone PEEK) powder and 4 to 10 volume percent a hard metal powder are blended and then compacted at room temperature to a relative green density greater than 60%. The resulting preform has an electrically conductive segregated network of metal particles throughout a PEEK matrix.

21 Claims, 3 Drawing Sheets

POLYMER COMPOSITE PREFORM AND PROCESS FOR PRODUCING SAME

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to compacting polymer powder and more particularly to compacting a semicrystalline polymer-metal powder blend to a form a preform having high strength and low electrical resistivity.

Many avionic components are currently made of aluminum, but interest in reducing weight has promoted the development of lighter-weight thermoplastic polymers to replace the aluminum. The parts for avionic components must, however, meet stringent electromagnetic interference (EMI) shielding requirements. Consequently, the thermoplastic polymers for these EMI shielding applications must be made to be electrically conductive. Metal filler is often added to the polymers for this purpose. In addition to being lighter in weight than aluminum, the resulting polymer-metal composites exhibit improved corrosion resistance and are cheaper to manufacture.

Many of the polymer composites currently used are formed by melt processing methods such as extrusion, and injection and compression molding. Aside from being costly, these methods of manufacture are undesirable because they result in composites with reduced mechanical properties and electrical conductivity, and typically require high metal filler loadings. These composites also experience high shear rates during these processes which causes undesirable metal particle segregation, particularly at the composite surfaces and along flow lines.

Certain types of metal-filled thermoplastic polymer composites are currently formed by the method of compaction. The thermplastics used are categorized as either amorphous or semicrystalline. Amorphous thermoplastics are usually compacted at a temperature near the glass-transition temperature. The semicrystalline thermoplastics compacted to-date, such as high density polyethylene, have been compacted at a temperature greater than their glass-transition temperatures. These particular semicrystalline thermoplastic polymers have such low glass-transition temperatures, that compaction above those temperatures is not uneconomical.

Polyether-etherketone (hereinafter referred to as PEEK) is a desirable candidate for polymer composite materials because of its excellent mechanical properties, and its good thermal stability and solvent resistance. However, due to its high melting point, high melt viscosity, and low crystallation rate, conventional melt processing methods are not economically attractive. Previously, PEEK has not been considered a candidate for compaction because of its high glass-transition temperature and the belief that successful compaction must take place above that temperature.

SUMMARY OF THE INVENTION

Accordingly, it is a general object of the present invention to provide a light-weight semicrystalline polymer composite preform which has high strength and low resistivity.

It is another object to provide such a composite preform which, when further processed into useful components, provides good electromagnetic interference shielding.

It is yet another object to provide a compacting process for producing a semicrystalline polymer composite preform which can be performed at a temperature significantly below the glass transition temperature.

Still another object is to provide a polyether-etherketone composite preform.

Briefly, these and other objects of the present invention are accomplished by a semicrystalline polymer composite preform produced by the steps of commingling particles of a PEEK powder and a hard metal filler powder to form a powder blend, and compacting the powder blend at room temperature and at a pressure sufficient to achieve a relative green density of at least 60%.

Other objects, advantages and novel features of the present invention will become apparent from the following detailed description thereof.

DESCRIPTION OF THE PREFERRED EMBODIMENT

Figure 1:
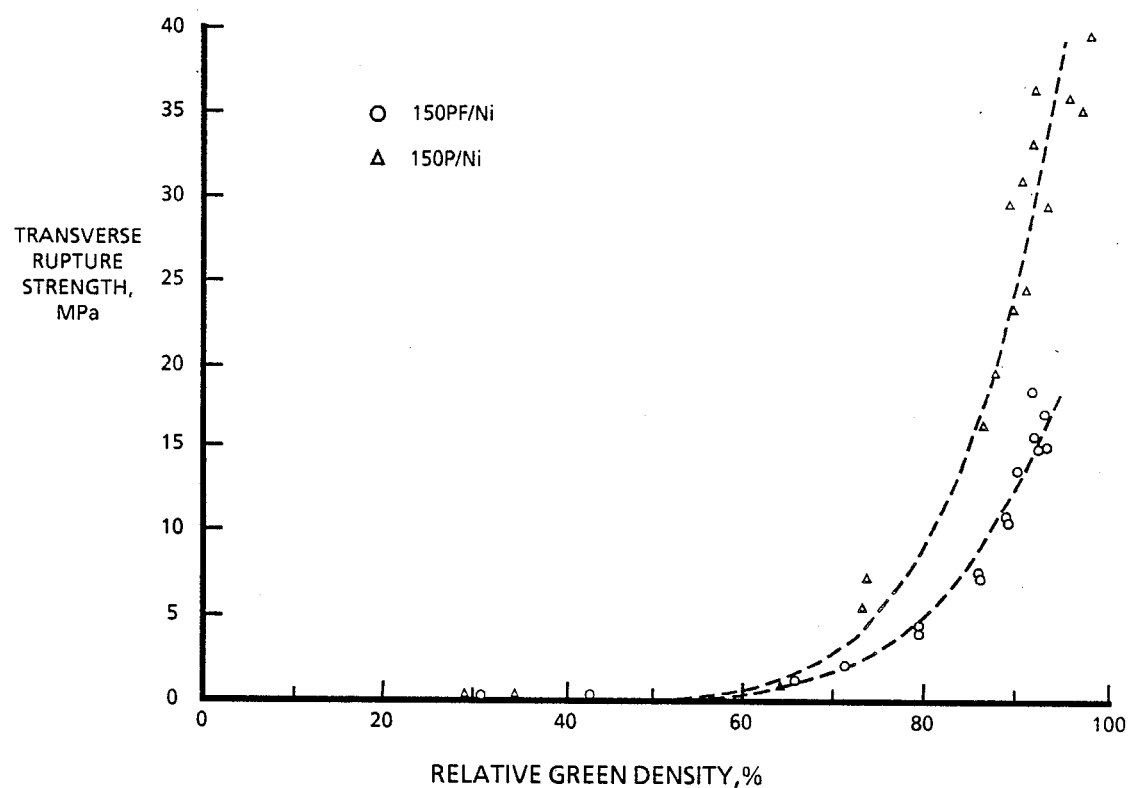
FIGS. 1 and 2 are plots of transverse rupture strength versus relative green density for various samples of 150 grade and 450 grade composite preforms, respectively, made according to the present invention.
Figure 2:
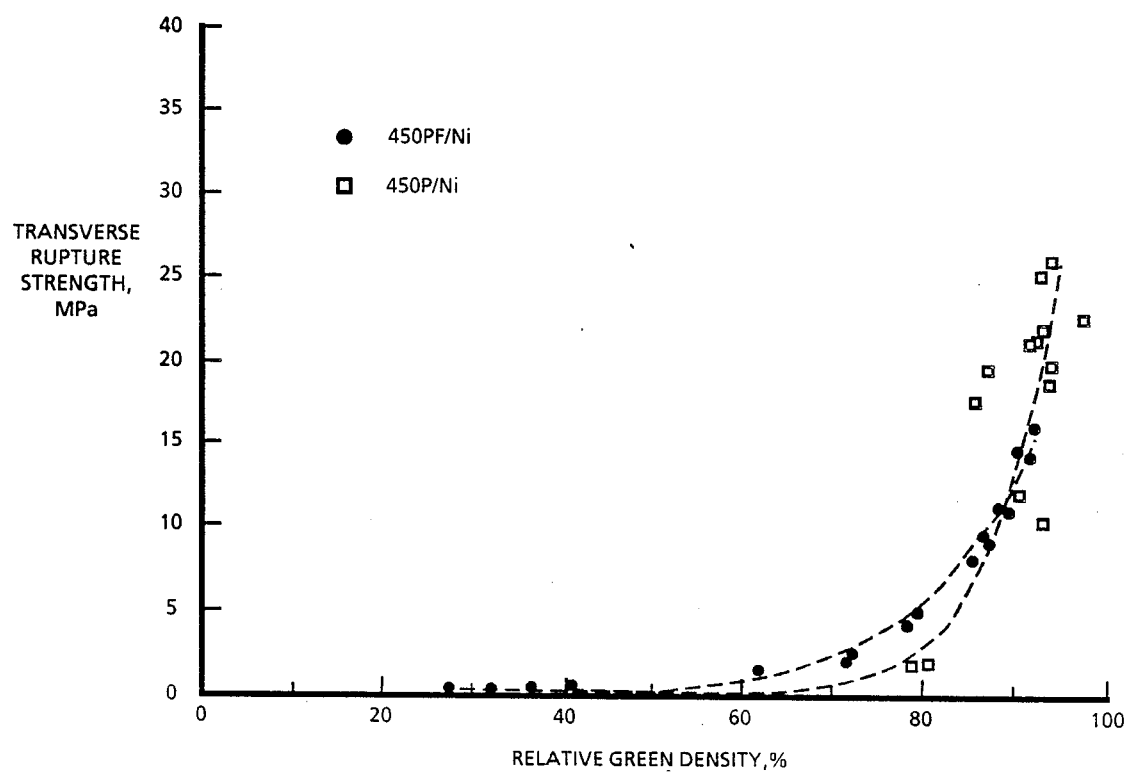
Figure 3:
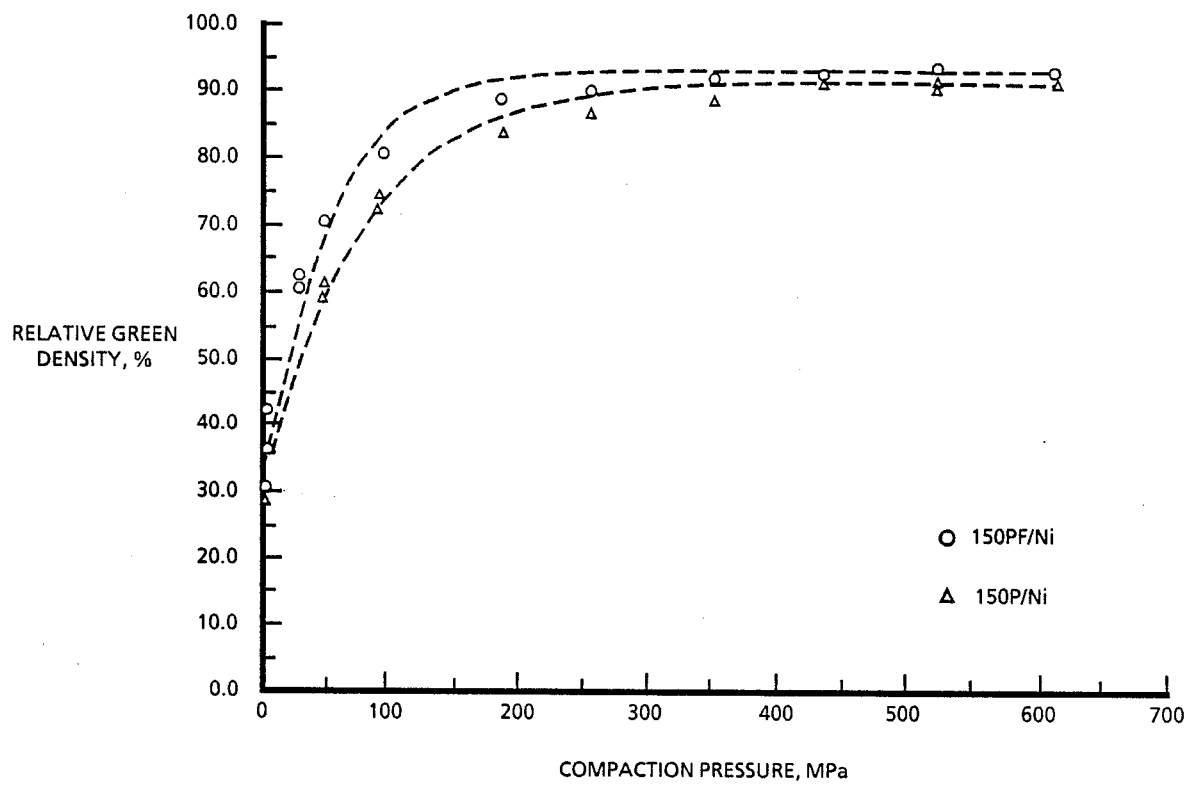
FIGS. 3 and 4 are plots of relative green density versus compaction pressure for various 150 grade and 450 grade composite preforms, respectively, made according to the present invention.
Figure 4:
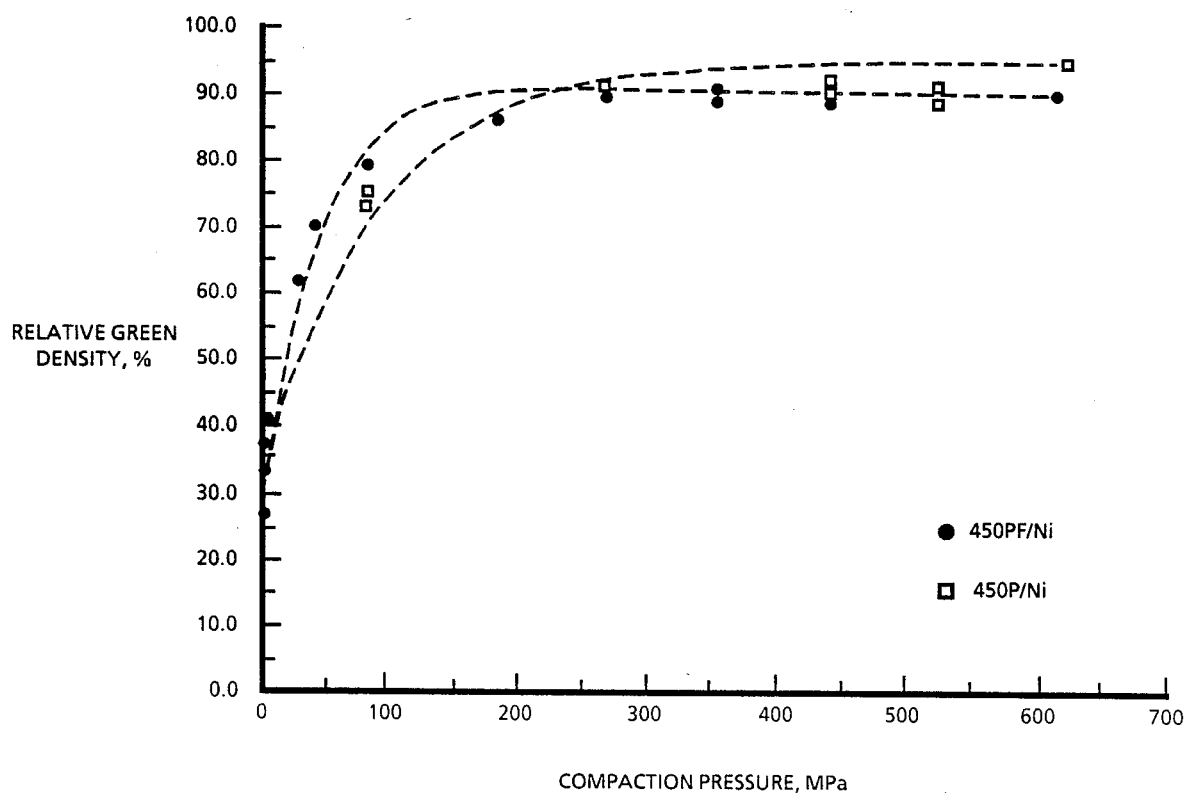
Figure 5:
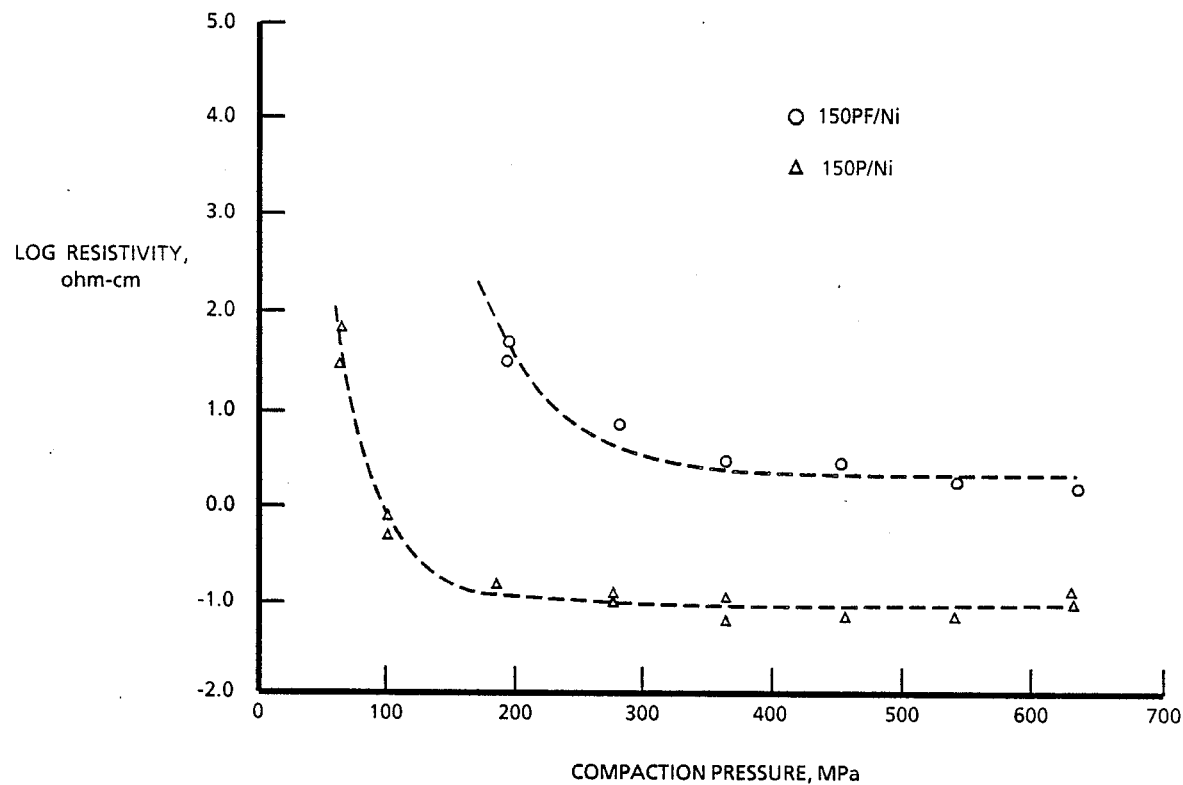
FIGS. 5 and 6 are plots of log resistivity versus compaction pressure for various 150 grade and 450 grade composite preforms, respectively, made according to the present invention.
Figure 6:
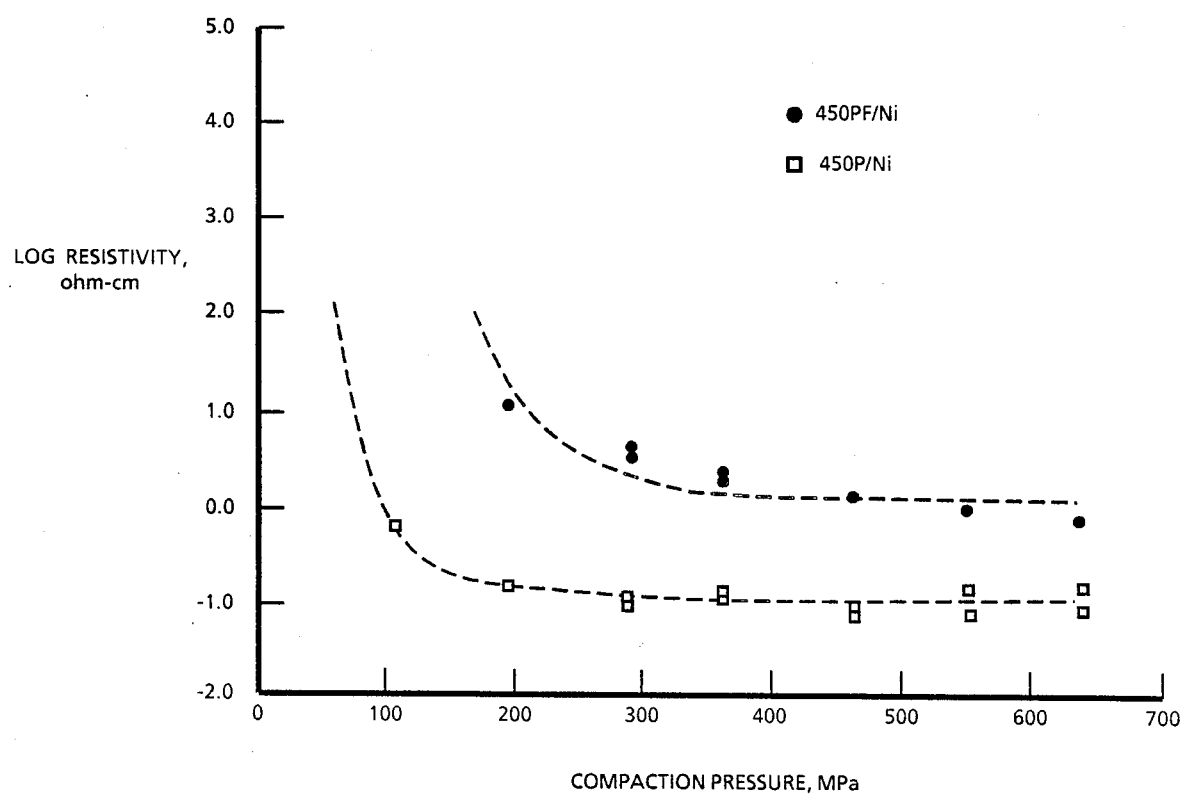

The present invention provides a semicrystalline polymer composite preform which has low electrical resistivity (high conductivity) and good mechanical properties such as high strength. The preform comprises a compacted blend of powders wherein polyetheretherketone (PEEK) forms a matrix and hard metal filler particles form a segregated network therethrough, the powders being compacted to at least a 60% relative green density.

The preform of the present invention may be produced in the following manner. Initially, the PEEK and metal filler powders are selected. Any commercially available PEEK powder may be used, varying both in terms of melt viscosity and particle size. Actual preform samples were produced using four different types of PEEK available from Imperial Chemical Industries, the characteristics of which are summarized in Table I. The 150 and 450 grades of PEEK have low and high melt viscosities, respectively. The PF and P designations refer to PEEK powders having fine- and coarse-sized particles, respectively.

TABLE I

| MATERIAL | POWDER DENSITY (g/cc) | WEIGHT PERCENT CRYSTALLINITY | PEAK MELTING TEMP. (°C.) | MEAN PARTICLE DIAMETER (μm) |
|---|---|---|---|---|
| 150 PF | 1.301 | 30 | 342 | 145 |

TABLE I-continued

| MATERIAL | POWDER DENSITY (g/cc) | WEIGHT PERCENT CRYSTALLINITY | PEAK MELTING TEMP. (°C.) | MEAN PARTICLE DIAMETER (μm) |
|---|---|---|---|---|
| 150 P | 1.318 | 42 | 343 | 530 |
| 450 PF | 1.281 | 14 | 338 | 170 |
| 450 P | 1.300 | 29 | 334 | 680 |

Properties and processing conditions of the preform will vary depending upon the PEEK type and grade, as described in more detail below.

The filler powder selected may be any electrically conductive metal which is harder than PEEK, such as nickel. Preferably the particles should have sharp surfaces to facilitate mechanical interlocking of particles during compaction. The particles size of the metal should be such that the mean particle size ratio of the PEEK to the metal is greater than 35 and preferably greater than 100.

The powders selected are then combined and commingled in the desired proportions. The metal powder may constitute any volume percentage of the preform greater than 4%. Since weight is a factor and metal adds weight, in a preferred embodiment the metal filler constitutes between 4 and 10 volume percent of the final preform. The powders are mixed in order to achieve a uniform coating of the metal particles on the surfaces of the PEEK particles. By coating the surface of the PEEK particles with the metal particles, metal-to-metal contacts may be achieved between the PEEK particles, producing a three-dimensional conductive segregated network throughout the PEEK matrix after compaction. One way in which this effect may be achieved is by tumbling the powders for 18 to 21 hours. This causes the smaller metal particles to electrostatically adhere to the larger PEEK particle surfaces. If the resulting blend is not compacted shortly after the tumbling process the particles should be retumbled for 2 to 3 hours just prior to compacting in order to recharge the particles.

The mixed powders are then compacted to a relative green density of at least 60%, preferably 90% or more, depending upon the grade and type of PEEK used and the transverse rupture strength desired. FIG'S. 1 and 2 show how the transverse rupture strength varies with relative green density for the two types of 150 grade and 450 grade PEEK, respectively. The compaction pressures required to achieve given relative green densities for the two types of 150 and 450 grade PEEK composites are shown in FIG'S. 3 and 4, respectively. The compaction process may be performed at room temperature, which is well below the 144° C. glass transition temperature of PEEK.

Any compacting means or equipment may be used which retains the powder's relative particle positions in the preform. Uniaxial compaction is one such means, performed with either a single- or double-acting die. Biaxial and triaxial compacting may also be used, as may cold isostatic pressing.

Actual samples using each of the four types of PEEK powder shown in Table I were produced according to the present invention. Each PEEK powder type was commingled with 10 volume percent nickel powder having a mean particle size of 4 μm. The powder blend was then compacted at room temperature in a press using a double-acting die with a one-minute dwell time at peak pressure and a punch velocity at zero pressure of approximately 5 cm/min.

The resulting preforms were tested in terms of electrical resistivity and strength. FIG'S. 1 and 2 show the transverse rupture strength results for composites using all four types of PEEK powder tested. It is believed that the increase strength observed in the preforms is due to the fact that the hard metal particles at the interfaces between the PEEK particles cause highly localized plastic deformation, which in turn increases the degree of mechanical interlocking during compaction.

FIG'S. 5 and 6 show the log of electrical resistivity as a function of compaction pressure for the 150 and 450 grade composites, respectively. As the compacting pressure increases up to about 300 MPa, large decreases in electrical resistivity occur. At compaction pressure above 300 MPa, the resistivity reaches a plateau value. The electrical resistivity results for the nickel-filled 150PF and 150P compacts were very similar to that of the nickel-filled 450PF and 450P samples, respectively. Resistivity values for nickel-filled 150PF, 150P, 450PF and 450P materials were as low as 1.38, 0.06, 0.76 and 0.08 ohm-cm, respectively. The electrical resistivities of the nickel-filled 150P and 450P composites were an order of magnitude lower than comparable injection molded composites.

More details concerning the experimental procedures and test results are available in "Compaction Study of Conductive Polyether-etherketone (PEEK) and Nickel Powder Composites", J. J. Reilly and I. L. Kamel, Report No. NADC-88034-60, available from the Naval Air Development Center, Warminster, Pa. 18974, incorporated by reference herein.

Some of the many features and advantages of the invention should now be readily apparent. For example, a light-weight polymer composite preform has been provided which can be processed further into useful articles which have high strength, low resistivity, and good EMI shielding capability. A process has been provided for producing a PEEK matrix composite preform by compacting it at room temperature.

Obviously, many modifications and variations of the present invention will be readily apparent to those ordinarily skilled in the art in light of the above teachings. It is therefore to be understood that, within the scope of the appended claims, the invention may be practiced otherwise than as specifically described.

What is claimed is:

1. A method of producing a semicrystalline polymer composite preform which has high strength and low electrical resistivity, comprising the steps of: commingling particles of a polyether-etherketone powder and a hard metal powder to form a powder a blend; and
compacting the powder blend below the glass transition
temperature of polyether-etherketone and at a pressure sufficient to achieve a relative green density of at least 60%.

2. The method of claim 1 wherein said compacting step is performed at room temperature.

3. The method of claim 1 wherein the metal powder constitutes at least 4 volume percent of the powder blend.

4. The method of claim 3 wherein the mean particle size ratio of the polyether-etherketone powder to the metal powder is greater than 35.

5. The method of claim 3 wherein the mean particle size ratio of the polyether-etherketone powder to the metal powder is greater than 100.

6. The method of claim 1 wherein the metal powder constitutes from around 4 to around 10 volume percent of the powder blend.

7. The method of claim 6 wherein the mean particle size ratio of the polyether-etherketone powder to the metal powder is greater than 35.

8. The method of claim 6 wherein the mean particle size ratio of the polyether-etherketone powder to the metal powder is greater than 100.

9. The method of claim 4 wherein said commingling step is performed for a sufficient length of time to obtain a uniform coverage of the metal particles on the surfaces of the polyether-etherketone particles.

10. The method of claim 9 wherein said commingling step is performed by tumbling the powders for at least 18 hours.

11. The method of claim 1 wherein the metal powder is nickel.

12. The method of claim 1 wherein the particles of the metal powder have sharp surfaces.

13. The method of claim 1 wherein the compacting step is performed uniaxially.

14. The method of claim 1 wherein the compacting is performed at a pressure in excess of 50 MPa.

15. The method of claim 1 wherein the polyether-etherketone has a high melt viscosity.

16. A method of producing a semicrystalline polymer composite preform which has high strength and low resistivity, comprising the steps of:
   selecting a polyether-etherketone powder;
   selecting a hard metal powder having sharp particle surfaces and a mean particle size such that the mean particle size ratio of the polyether-etherketone powder to the metal powder is greater than 35;
   combining the powders in proportions such that the metal powder constitutes about 4 to 10 volume percent of the resulting combination;
   mixing the powders for a length of time sufficient to achieve a uniform coverage of the metal particles on the surfaces of the polyether-etherketone particles; and
   compacting the mixed powders below the glass transition temperature of polyether-etherketone at a pressure greater than 50 MPa.

17. A polymer composite preform which has high strength and low resistivity, comprising:
   a polyether-etherketone powder forming a matrix; and
   a hard metal powder forming a segregated network within the matrix;
   wherein the mean particle size ratio of the polyether-etherketone powder to the hard metal powder is greater than 100 and the preform has at least a 60% relative green density.

18. The polymer composite preform of claim 17 wherein said hard metal powder constitutes from about 4 to about 10 volume percent of the preform.

19. The polymer composite preform of claim 17 wherein said hard metal powder is nickel.

20. The polymer composite preform of claim 17 wherein the particles of said hard metal powder have sharp surfaces.

21. A method of producing a semicrystalline polymer composite preform which has high strength and low electrical resistivity, comprising the steps of:
   commingling particles of a polyether-etherketone powder and a hard metal powder to form a powder blend wherein the mean particle size ratio of the polyether-etherketone powder to the hard metal powder is greater than 100; and
   compacting the powder blend at a pressure sufficient to achieve a relative green density of at least 60%.

* * * * *